(12) United States Patent
Oh et al.

(10) Patent No.: US 11,043,992 B2
(45) Date of Patent: Jun. 22, 2021

(54) ANTENNA APPARATUS AND METHOD OF DRIVING THE SAME

(71) Applicants: Hyundai Motor Company, Seoul (KR); Kia Motors Corporation, Seoul (KR)

(72) Inventors: Dong In Oh, Hwaseong-si (KR); Sun In Jeong, Siheung-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/561,934

(22) Filed: Sep. 5, 2019

(65) Prior Publication Data

US 2020/0212968 A1 Jul. 2, 2020

(30) Foreign Application Priority Data

Dec. 26, 2018 (KR) .................. 10-2018-0169346

(51) Int. Cl.
*H01Q 9/04* (2006.01)
*H01Q 21/06* (2006.01)
*H04B 7/0452* (2017.01)
*H04B 7/024* (2017.01)

(52) U.S. Cl.
CPC ......... *H04B 7/0452* (2013.01); *H01Q 9/0407* (2013.01); *H01Q 21/065* (2013.01); *H04B 7/024* (2013.01)

(58) Field of Classification Search
CPC .................. H01Q 3/30; H01Q 3/242
See application file for complete search history.

(56) References Cited

U.S. PATENT DOCUMENTS

| | | | | |
|---|---|---|---|---|
| 8,159,394 | B2 * | 4/2012 | Hayes | H01Q 21/205 |
| | | | | 342/368 |
| 10,522,908 | B2 * | 12/2019 | Wu | H01Q 5/371 |
| 2002/0036586 | A1 * | 3/2002 | Gothard | H01Q 3/242 |
| | | | | 342/374 |

FOREIGN PATENT DOCUMENTS

KR 101516572 B1 4/2015

* cited by examiner

*Primary Examiner* — Alexander H Taningco
*Assistant Examiner* — Amy X Yang
(74) *Attorney, Agent, or Firm* — Slater Matsil, LLP (57) ABSTRACT

An antenna apparatus includes a number of antenna devices disposed to surround a center. M switches are connected to the plurality of antenna devices, M being an integer equal to or greater than 1. The of antenna devices include N antenna device groups and each of the N antenna device groups includes M antenna devices. N is an integer equal to or greater than 1. For each of the M switches, the $m^{th}$ switch is connected to the $m^{th}$ antenna device of the each of the N antenna device groups, m being an integer ranging from 1 to M.

20 Claims, 11 Drawing Sheets

Phase shifter

| | DIRECTION 1 | DIRECTION 2 | DIRECTION 3 | DIRECTION 4 | DIRECTION 5 | DIRECTION 6 | DIRECTION 7 | DIRECTION 8 | DIRECTION 9 | DIRECTION 10 | DIRECTION 11 | DIRECTION 12 | DIRECTION 13 | DIRECTION 14 | DIRECTION 15 | DIRECTION 16 |
|---|---|---|---|---|---|---|---|---|---|---|---|---|---|---|---|---|
| SP4T_1_Port #1 | ON | | | | | | | | | | | | | ON | ON | ON |
| SP4T_2_Port #1 | ON | ON | | | | | | | | | | | | | ON | ON |
| SP4T_3_Port #1 | ON | ON | ON | | | | | | | | | | | | | ON |
| SP4T_4_Port #1 | ON | ON | ON | ON | | | | | | | | | | | | |
| SP4T_1_Port #2 | ON | ON | ON | ON | ON | | | | | | | | | | | |
| SP4T_2_Port #2 | | | ON | ON | ON | ON | | | | | | | | | | |
| SP4T_3_Port #2 | | | | ON | ON | ON | ON | | | | | | | | | |
| SP4T_4_Port #2 | | | | | ON | ON | ON | ON | | | | | | | | |
| SP4T_1_Port #3 | | | | | | ON | ON | ON | ON | | | | | | | |
| SP4T_2_Port #3 | | | | | | | ON | ON | ON | ON | | | | | | |
| SP4T_3_Port #3 | | | | | | | | ON | ON | ON | ON | | | | | |
| SP4T_4_Port #3 | | | | | | | | | ON | ON | ON | ON | | | | |
| SP4T_1_Port #4 | | | | | | | | | | ON | ON | ON | ON | | | |
| SP4T_2_Port #4 | | | | | | | | | | | ON | ON | ON | ON | | |
| SP4T_3_Port #4 | | | | | | | | | | | | ON | ON | ON | ON | |
| SP4T_4_Port #4 | | | | | | | | | | | | | ON | ON | ON | ON |

ANTENNA APPARATUS AND METHOD OF DRIVING THE SAME

CROSS-REFERENCE TO RELATED APPLICATIONS

This application claims priority to Korean Patent Application No. 10-2018-0169346, filed on Dec. 26, 2018, which application is hereby incorporated herein by reference.

TECHNICAL FIELD

Embodiments relate to an antenna apparatus and a method of driving the same.

BACKGROUND

In general, advanced technology has been applied to vehicles to enhance the mobility and usefulness thereof, and accordingly, vehicles have become essential products in modern society.

A vehicle generally includes an audio device and a video device to enable a driver to listen to music and to see an image during driving as well as to simply transport goods and people, and a navigation device for displaying a path to a destination of the driver is also extensively installed.

Recently, there has been an increasing need for communication between a vehicle and an external device. For example, a navigation function of guiding a path to a destination requires information on a traffic situation of a load in order to search for an optimum path. Such a traffic situation is changed sometimes, and thus, a vehicle needs to acquire information on the traffic situation in real time.

In order to ensure driver safety and driver convenience, a forward collision warning system (FCWS), autonomous emergency braking (AEB), and the like have been actively developed. The FCWS and the AEB may calculate whether crash of a front vehicle happens, an estimated crash time, and the like based on position information of a front vehicle, which is detected by a radar detection and ranging (RADAR).

In this case, a communication device with an external vehicle and a RADAR device for forward collision warning may include an antenna apparatus for transmitting and receiving radio waves.

Figure 1:
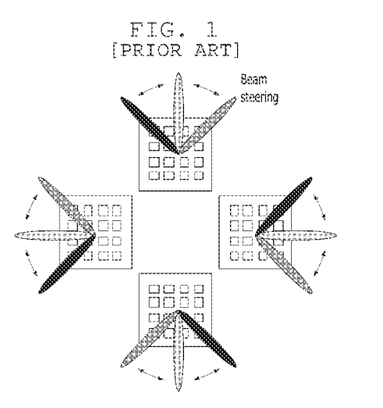
FIG. 1 is a diagram showing driving of a conventional antenna apparatus.
Figure 2:
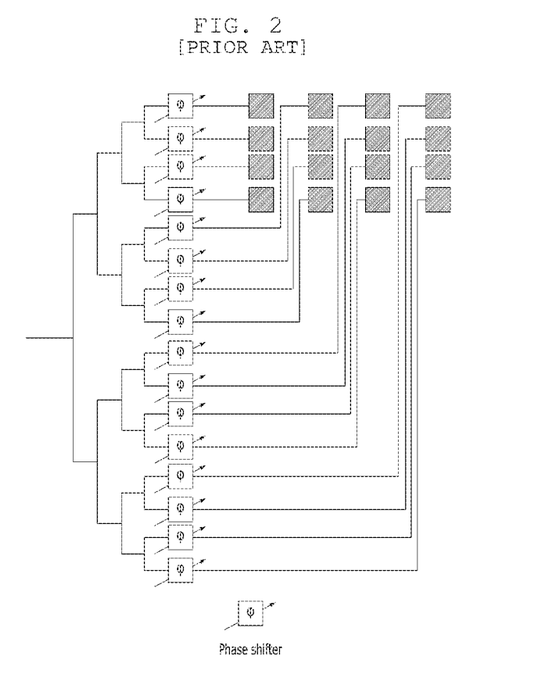
FIG. 2 is a diagram showing a configuration of the antenna apparatus of FIG. 1.

FIG. 1 is a diagram showing driving of a conventional antenna apparatus. FIG. 2 is a diagram showing a configuration of the antenna apparatus of FIG. 1.

As shown in the drawings, a conventional antenna, particularly, a 5G antenna is configured to steer a main beam direction of a patch antenna at a desired angle using a phase shifter for beamforming. Accordingly, an antenna apparatus is configured by combining a plurality of antenna arrays, and each antenna apparatus of the antenna array controls a phase shifter to change a beam direction of the antenna apparatus.

In detail, the conventional antenna may steer the main beam direction of the patch antennal at a desired angle using the phase shifter for beamforming.

However, the conventional antenna apparatus has the following problem.

Four patch antennas need to be sequentially operated, and thus, there is a problem in that a search time is increased. In addition, each patch antenna has a complicated structure, and there is a need for a complicated circuit for controlling the four patch antennas.

SUMMARY

Embodiments relate to an antenna apparatus, a method of driving the same, a program, and a recording medium.

Particular embodiments relate to an antenna apparatus, a method of driving the same, a program, and a recording medium, for functioning as a switch without addition of a circuit, selecting some desired antennas, and selecting a beam in a desired direction.

Accordingly, embodiments are directed to an antenna apparatus, a method of driving the same, a program, and a recording medium that can substantially obviate one or more problems due to limitations and disadvantages of the related art.

Embodiments can provide an antenna apparatus with a reduced searching time and a simple driving circuit, a method of driving the same, a program, and a recording medium.

In one embodiment, an antenna apparatus includes a plurality of antenna devices disposed to surround a center, and first to $M^{th}$ (M being an integer equal to or greater than 1) switches connected to the plural antenna devices. The plural antenna devices include first to $N^{th}$ (N being an integer equal to or greater than 1) antenna device groups and each of the first to $N^{th}$ antenna device groups includes first to $M^{th}$ antenna devices. The first switch is connected to each of first antenna devices of the first to $N^{th}$ antenna device groups, the $J^{th}$(J being an integer and 1<J<M) switch is connected to each of $J^{th}$ antenna devices of the first to $N^{th}$ antenna device groups, and the $M^{th}$ switch is connected to each of the $M^{th}$ antenna switches of the first to $N^{th}$ antenna device groups.

M and N may each be 4.

The plural antenna devices may surround the center and may be disposed at positions of concentric circles or edges of a polygonal shape.

The odd-numbered switches or the even-numbered switches may be turned off.

Switches positioned in first to $(M/2)^{th}$ sequences or switches positioned in $(M/2)^{th}$ to $M^{th}$ sequences among the switches may be turned off.

Each of the switches may include first and second sub-switches, and the first sub-switch of each of the switches may be connected to each of odd-numbered antenna device groups of the first to $N^{th}$ antenna device groups.

Each of the switches may include first and second sub-switches, and the second sub-switch of each of the switches may be connected to each of even-numbered antenna device groups of the first to $N^{th}$ antenna device groups.

In another embodiment, a method of driving an antenna apparatus includes disposing a plurality of antenna devices to surround a center, and connecting first to $M^{th}$ (M being an integer equal to or greater than 1) switches to the plural antenna devices, wherein the plural antenna devices include first to $N^{th}$ (N being an integer equal to or greater than 1) antenna device groups, and each of the first to $N^{th}$ antenna device groups includes first to $M^{th}$ antenna devices, the first switch is connected to each of first antenna devices of the first to $N^{th}$ antenna device groups, the $J^{th}$(J being an integer and 1<J<M) switch is connected to each of $J^{th}$ antenna devices of the first to $N^{th}$ antenna device groups, and the $M^{th}$ switch is connected to each of the $M^{th}$ antenna switches of the first to $N^{th}$ antenna device groups.

In another embodiment, a program recorded in a computer readable recording medium executes the method by a processor.

In another embodiment, a computer readable recording medium has recorded thereon the program.

BRIEF DESCRIPTION OF THE DRAWINGS

Arrangements and embodiments may be described in detail with reference to the following drawings in which like reference numerals refer to like elements and wherein.

DETAILED DESCRIPTION OF ILLUSTRATIVE EMBODIMENTS

The following methods and vehicle controllers according to embodiments will be described in more detail with reference to the accompanying drawings. Terms used therein are used only for illustrative purposes and are not intended to limit the scope of embodiments.

The term "comprises", "includes", "arrange", or "has" described herein should be interpreted not to exclude other elements but to further include such other elements since the corresponding elements may be included unless mentioned otherwise.

The singular expressions including "the" in the present specification and claims include the plural expressions unless clearly specified otherwise in context. In addition, the term "and/or" includes any and all combinations of one or more of the associated listed items.

Figure 3:
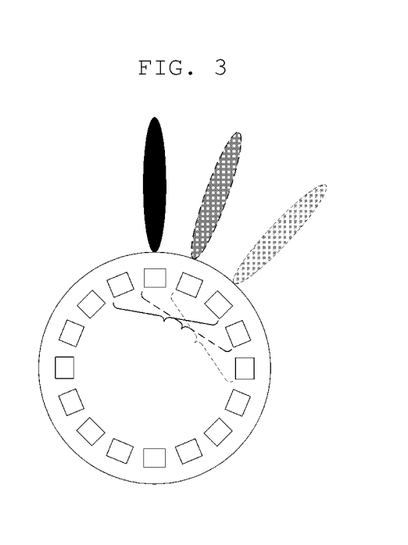
FIGS. 3, 4A and 4B are diagrams showing the principle of an antenna apparatus according to embodiments.
Figure 4A:
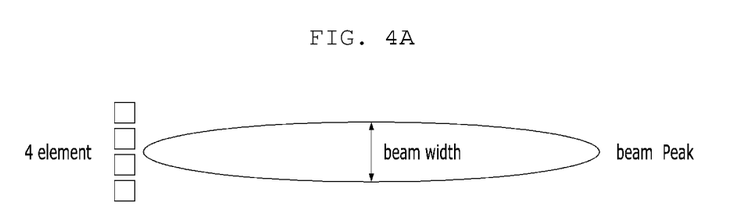
Figure 4B:
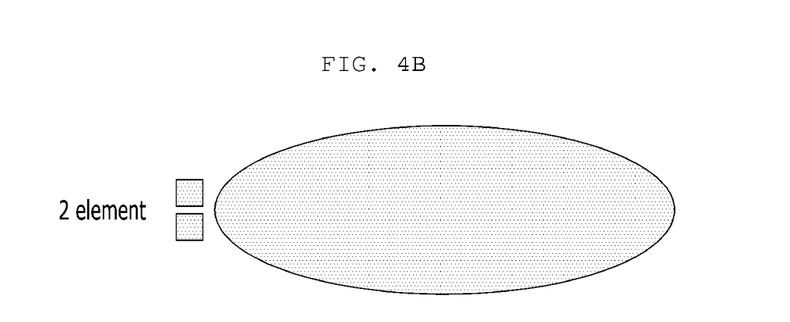

FIGS. 3, 4A and 4B are diagrams showing the principle of an antenna apparatus according to embodiments.

The antenna apparatus according to embodiments may be configured in such a way that patches are disposed at positions of a circumference of a circular shape or edges of a polygonal shape, which surrounds the center, but not formation 4x4 without use of a phase shifter, and a desired antenna may be selected to form a beam and a direction of the beam may be changed.

For example, in FIG. 4A, four antenna devices may be selected to form a beam with a reduced width and a high peak, and in FIG. 4B, two antenna devices may be selected to form a beam with an increased width and a low peak.

Figure 5:
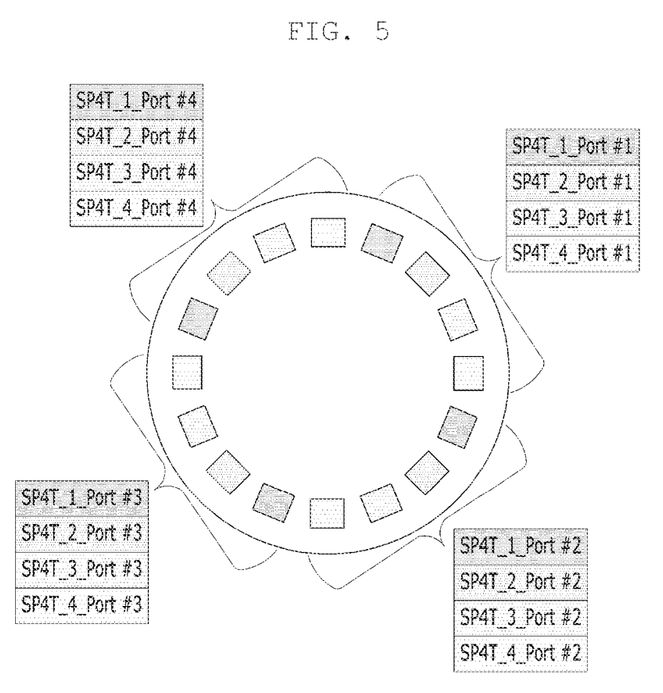
FIGS. 5 and 6 are detailed diagrams showing the principle of an antenna apparatus according to embodiments.
Figure 6:
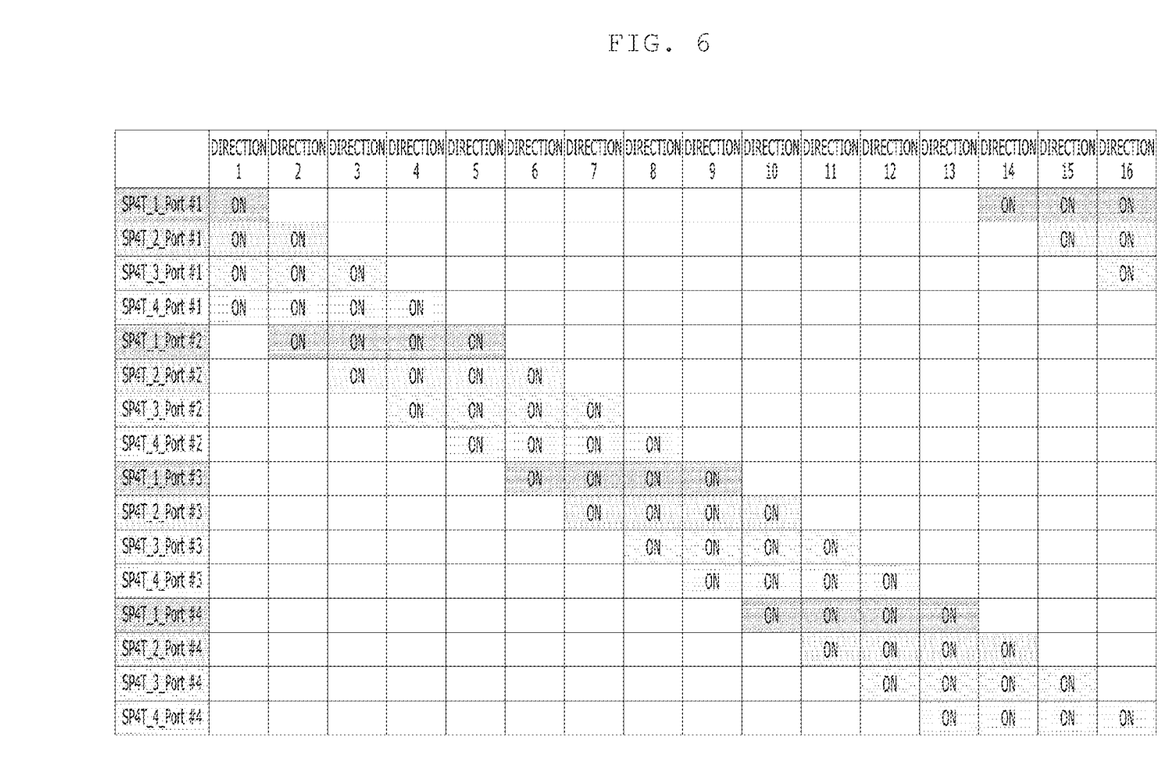
Figure 7:
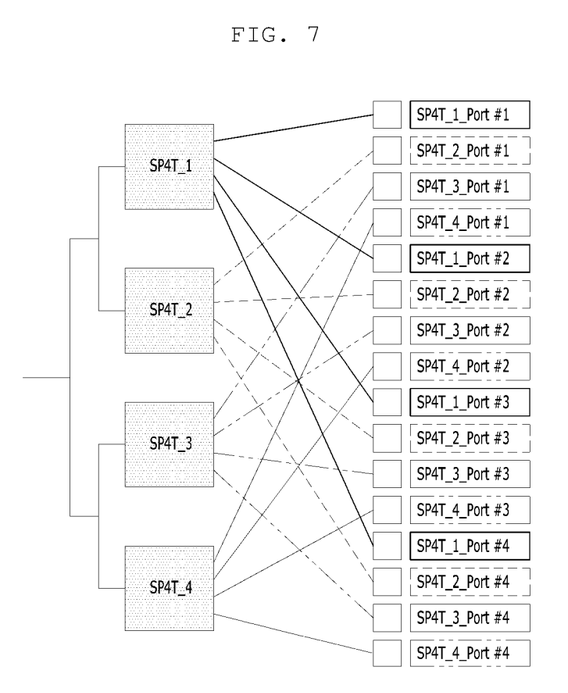
FIG. 7 is a diagram showing an antenna apparatus according to an embodiment.

FIGS. 5 and 6 are detailed diagrams showing the principle of an antenna apparatus according to embodiments. FIG. 7 is a diagram showing an antenna apparatus according to an embodiment.

The antenna apparatus according to the present embodiment may include a plurality of antenna devices disposed to surround the center, and first to $M^{th}$ (M being an integer equal to or greater than 1) switches connected to the plural antenna devices.

A plurality of antenna devices illustrated in a rectangular shape may include first to $N^{th}$ (N being an integer equal to or greater than 1) antenna device groups, and each of the first to $N^{th}$ antenna device groups may include first to $M^{th}$ (M being an integer equal to or greater than 1) antenna devices.

According to the embodiment shown in FIG. 5, M and N are each 4, that is, first to fourth antenna device groups are illustrated, a first antenna device group may include four antenna devices SP4T_1_Port #1, SP4T_2_Port #1, SP4T_3_Port #1, and SP4T_4_Port #1, a second antenna device group may include four antenna devices SP4T_1_Port #2, SP4T_2_Port #2, SP4T_3_Port #2, and SP4T_4_Port #2, a third antenna device group may include four antenna devices SP4T_1_Port #3, SP4T_2_Port #3, SP4T_3_Port #3, and SP4T_4_Port #3, a fourth antenna device group may include four antenna devices SP4T_1_Port #4, SP4T_2_Port #4, SP4T_3_Port #4, and SP4T_4_Port #4. First to fourth switches SPAT_1 to SPAT_4 are illustrated in FIG. 7.

The first switch SP4T_1 may be connected to each of first antenna devices of the first to $N^{th}$ antenna device groups, a $J^{th}$ (J being an integer and 1<J<M) switch may be connected to each of $J^{th}$ antenna devices of the first to $N^{th}$ antenna device group, and an $M^{th}$ switch may be connected to each of $M^{th}$ antenna devices of the first to $N^{th}$ antenna device groups.

That is, according to the present embodiment, the first switch SP4T_1 may be connected to the first antenna devices SP4T_1_Port #1, SP4T_1_Port #2, SP4T_1_Port #3, and SP4T_1_Port #4 of the first to fourth antenna device groups, the second switch SP4T_2 may be connected to the second antenna devices SP4T_2_Port #1, SP4T_2_Port #2, SP4T_2_Port #3, and SP4T_2_Port #4 of the first to fourth antenna device groups, the third switch SP4T_3 may be connected to the third antenna devices SP4T_3_Port #1, SP4T_3_Port #2, SP4T_3_Port #3, and SP4T_3_Port #4 of the first to fourth antenna device groups, and the fourth switch SPAT_4 may be connected to the fourth antenna devices SP4T_4_Port #1, SP4T_4_Port #2, SP4T_4_Port #3, and SP4T_4_Port #4 of the first to fourth antenna device groups.

As shown in FIG. 6, four antenna devices among 16 of total antenna devices may be turned on to form an antenna beam by combining the four antenna devices. In addition, the four antenna devices may be selectively turned on through four switches. In addition, FIG. 6 illustrates 16 combinations of the case in which four antenna devices are turned on, and combinations of adjacent antenna devices are simply different in that one switch is changed to an off-state from an on-state and another switch is changed to an on-state from an off-state.

Figure 8:
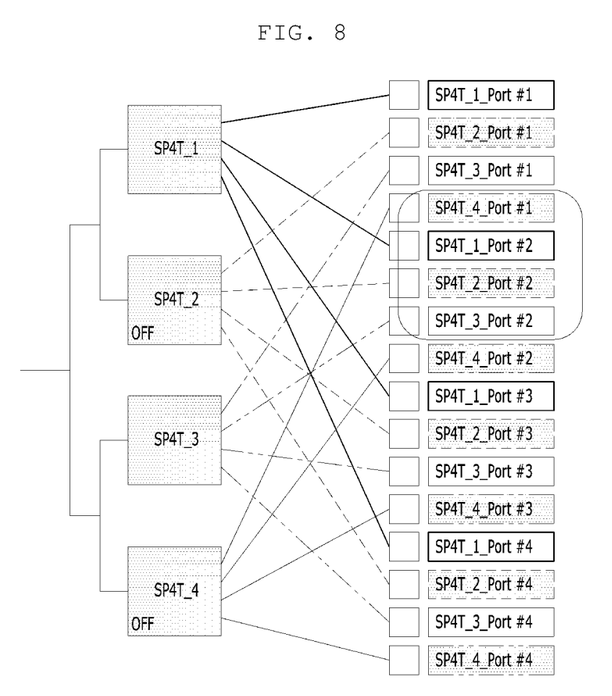
FIG. 8 is a diagram showing an antenna apparatus according to another embodiment.

FIG. 8 is a diagram showing an antenna apparatus according to another embodiment.

In the embodiment of FIG. 8, even-numbered switches SP4T-2 and SP4T-4 may be turned off, and accordingly, only other two switches SP4T-1 and SP4T-3 may be turned on and may adjust a beam direction of the antenna apparatus by driving only total two switches SP4T. Although not illustrated, odd-numbered switches SP4T-1 and SP4T-3 may be turned off, and only the even-numbered switches SP4T-2 and SP4T-4 may be turned on.

According to the present embodiment, two switches may be turned on and only two switches from a switch group may also be turned on, and accordingly, searching may be performed in four of total directions and the most appropriate direction may be selected from the four beam directions. Then, all the four switches may be turned on and adjacent beams for respective angles may be compared to select the most appropriate direction.

Figure 9:
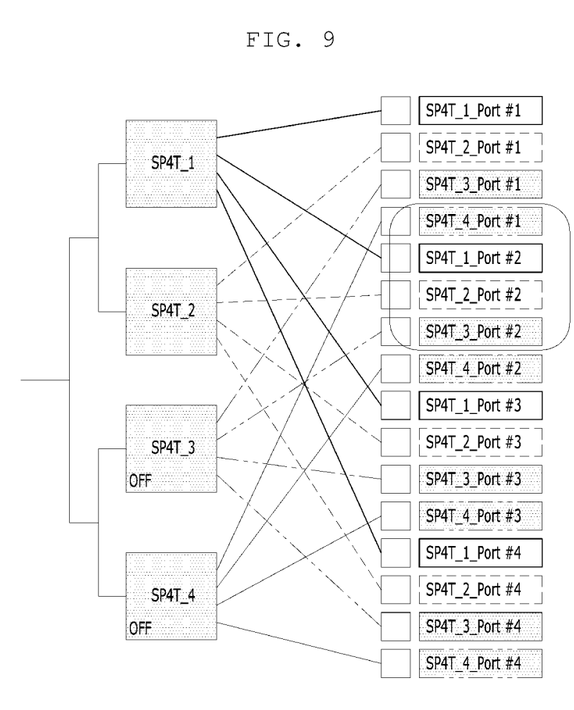
FIG. 9 is a diagram showing an antenna apparatus according to another embodiment.

FIG. 9 is a diagram showing an antenna apparatus according to another embodiment. According to the present embodiment, among four switches, the third and fourth switches SP4T-3 and SP4T-4 may be turned off, and only the first and second switches SP4T-1 and SP4T-2 may be turned on. That is, when M of total switches are included, switches positioned in first to $(M/2)^{th}$ sequences or switches positioned in $(M/2)^{th}$ to $M^{th}$ sequences may be turned off. Driving of the antenna apparatus according to the present embodiment may be the same as in the description given with reference to FIG. 8.

Figure 10A:
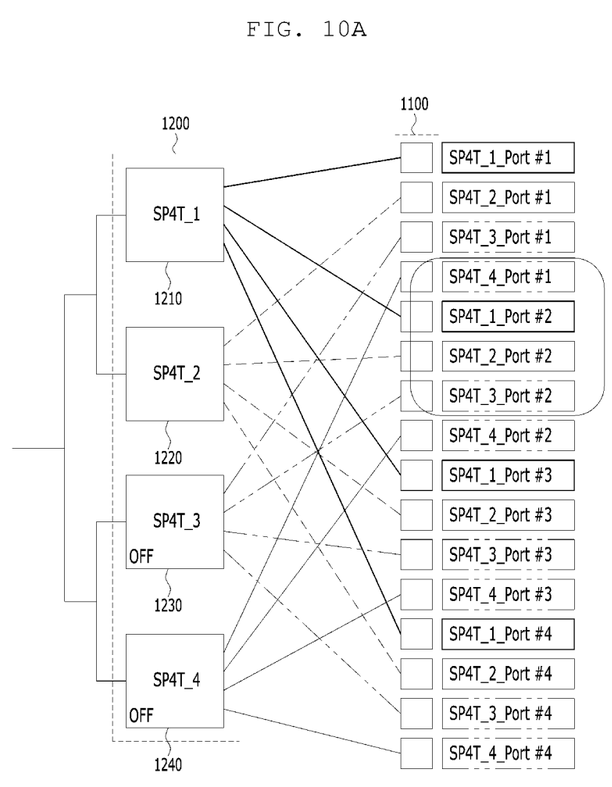
FIGS. 10A and 10B are diagrams showing an antenna apparatus according to anther embodiment.
Figure 10B:
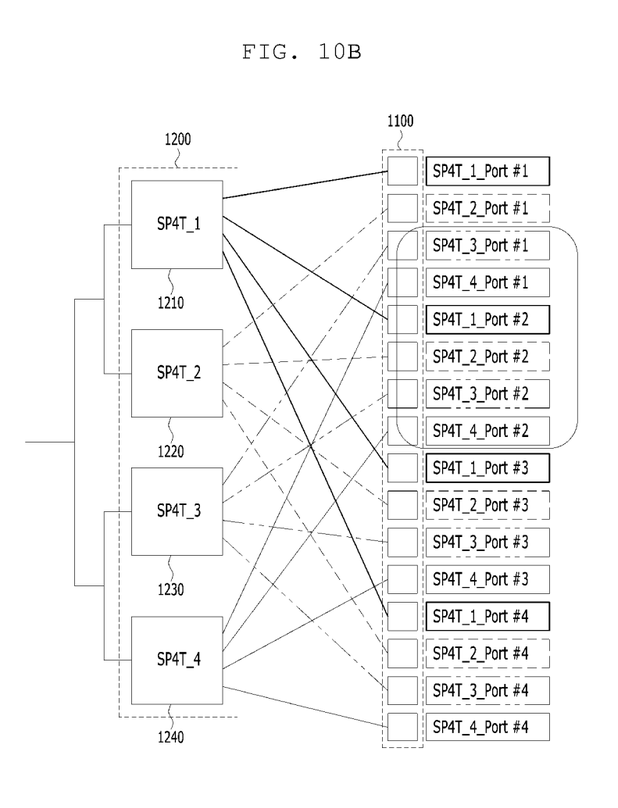

FIGS. 10A and 10B are diagrams showing an antenna apparatus according to another embodiment. According to the present embodiment, as shown in FIG. 10A, two devices may be selected among 16 antenna devices, may be turned on, and then, may be scanned, and four antenna devices may be selected, may be turned on, and may be scanned. Then, as shown in FIG. 10B, two antenna devices may be further turned on, and a beam direction may be more precisely searched for using six of total antenna devices.

Figure 11:
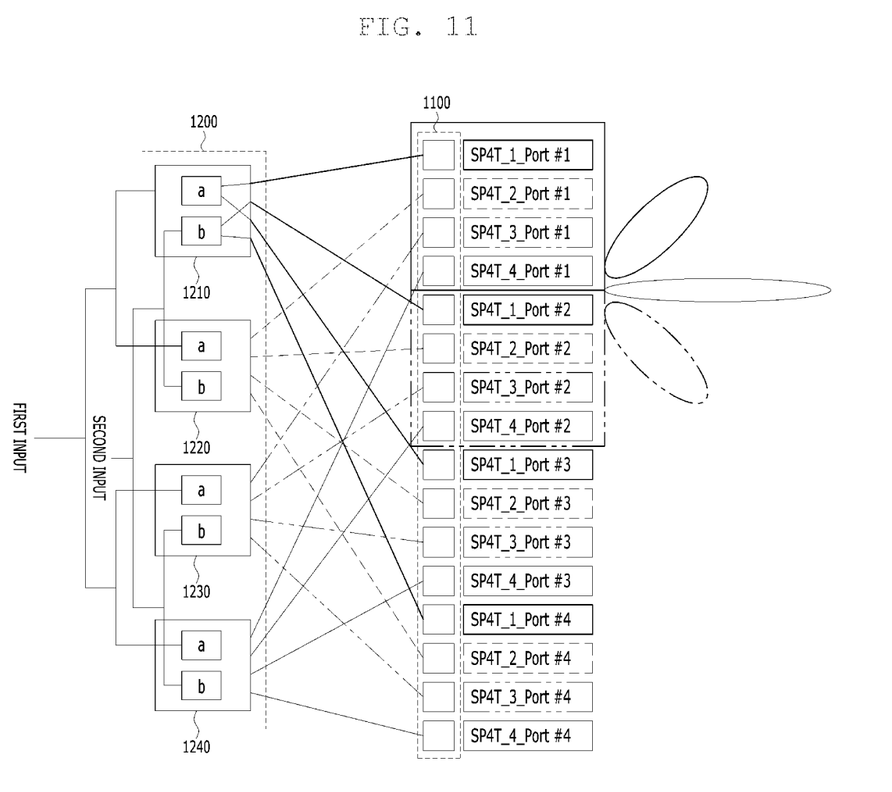
FIG. 11 is a diagram showing an antenna apparatus according to another embodiment.

FIG. 11 is a diagram showing an antenna apparatus according to another embodiment.

In the antenna apparatus according to the present embodiment, first to fourth switches 1210 to 1240 may be included in a switch 1200, and each of the first to fourth switches 1210 to 1240 may include a first sub-switch a and a second sub-switch b. The first sub-switch a of each of the first to fourth switches 1210 to 1240 may be connected to odd-numbered antenna devices . . . _Port #1, . . . Port #3 among first to $N^{th}$ antenna devices, and the second sub-switch b may be connected to even-numbered antenna devices . . . _Port #2, . . . Port #4 among the first to $N^{th}$ antenna devices.

Accordingly, when the first sub-switch a in the first to fourth switches 1210 to 1240 may be turned on via first input, antenna devices connected to the first sub-switch a may be turned on to obtain a beam direction shown in an upper-right portion of FIG. 11, and when the second sub-switch b in the first to fourth switches 1210 to 1240 is turned on via second input, antenna devices connected to the second sub-switch b may be turned on to obtain a beam direction shown in a lower-right portion of FIG. 11. When the first input and the second input are combined to apply one signal, that is, when all the first sub-switch a and the second sub-switch b are turned on, the beam shapes shown in the upper-right and lower-right portions of FIG. 11 may be combined to generate a beam with a narrow width of the center and a higher peak, and thus, more precise scan and searching may be possible.

Figure 12A:
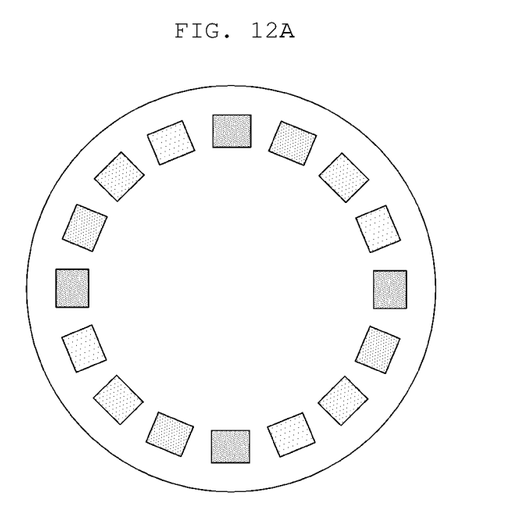
FIGS. 12A and 12B are diagrams showing examples in which the number of antennas of an antenna apparatus is changed according to embodiments.
Figure 12B:
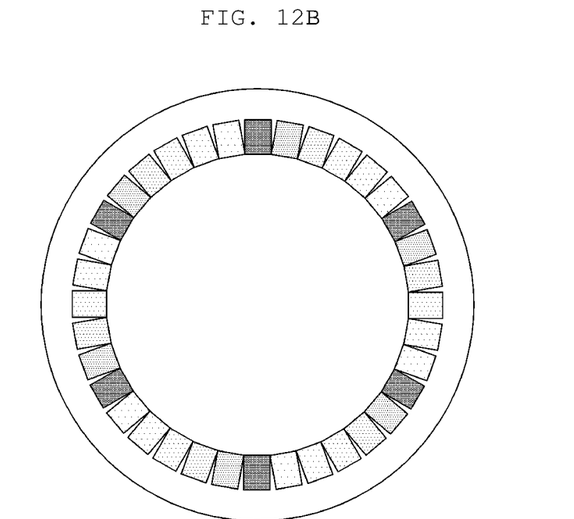

FIGS. 12A and 12B are diagrams showing examples in which the number of antennas of an antenna apparatus is changed according to embodiments.

FIG. 12A illustrates the case in which four switches, that is, SP4T are used to form 16 beam directions and FIG. 12B illustrates the case in which five switches, that is, SP6T are used to form 36 beam directions.

In the aforementioned method of driving an antenna device, a plurality of antenna devices may be disposed to surround the center, and first to $M^{th}$ (M being an integer equal to or greater than 1) switches may be connected to the plural antenna devices. As described above, the plural antenna devices may include first to $N^{th}$ antenna device groups, each of the first to $N^{th}$ antenna device groups may include first to $M^{th}$ (M being an integer equal to or greater than 1) antenna devices, the first switch may be connected to the first antenna devices of the first to $N^{th}$ antenna device groups, a $J^{th}$ (J being an integer and 1<J<M) switch may be connected to each of $J^{th}$ antenna devices of the first to $N^{th}$ antenna device groups, and the $M^{th}$ switch may be connected to each of the $M^{th}$ antenna devices of the first to $N^{th}$ antenna device groups to drive the antenna device.

The aforementioned method of driving an antenna apparatus may be recorded on a computer readable recording medium, and in this case, may be recorded as a program for executing the driving method of the antenna apparatus by a processor.

In an antenna device, a method of driving the same, a program, and a recording medium, searching in a beam direction may be possible depending on the number of switches, and the shape and number of beams may be allocated depending on the cases, and thus, it may be possible to rapidly and precisely perform scanning in a beam direction. In addition, a complicated circuit for controlling a plurality of patch antennas may not be required, and searching in a beam direction may be subdivided using a method of configuring a sub-switch in a switch, or the like.

In an antenna device, a method of driving the same, a program, and a recording medium according to embodiments, searching in a beam direction may be possible depending on the number of switches, and the shape and number of beams may be allocated depending on the cases, and thus, it may be possible to rapidly and precisely perform scanning in a beam direction. In addition, a complicated circuit for controlling a plurality of patch antennas may not be required, and searching in a beam direction may be subdivided using a method of configuring a sub-switch in a switch, or the like.

It will be apparent to those skilled in the art that various modifications and variations can be made in the present disclosure without departing from the spirit or scope of the present disclosure.

Thus, it is intended that the present disclosure cover the modifications and variations of the present disclosure provided they come within the scope of the appended claims and their equivalents.

What is claimed is:

1. An antenna apparatus comprising:
   a plurality of antenna devices disposed to surround a center; and
   M switches connected to the plurality of antenna devices, M being an integer equal to or greater than 1;
   wherein the plurality of antenna devices include N antenna device groups, each of the N antenna device groups including M antenna devices, N being an integer equal to or greater than 1; and
   wherein for each of the M switches, the $m^{th}$ switch is connected to the $m^{th}$ antenna device of the each of the N antenna device groups, m being an integer ranging from 1 to M.

2. The antenna apparatus of claim 1, wherein M and N are each 4.

3. The antenna apparatus of claim 1, wherein the plurality of antenna devices surround the center and are disposed at positions of concentric circles.

4. The antenna apparatus of claim 1, wherein the plurality of antenna devices surround the center and are disposed at edges of a polygonal shape.

5. The antenna apparatus of claim 1, wherein the odd-numbered switches or the even-numbered switches are configured to be turned off during operation of the antenna apparatus.

6. The antenna apparatus of claim 1, wherein M is an even number and wherein switches positioned in first to $(M/2)^{th}$ sequences or switches positioned in $(M/2+1)^{th}$ to $M^{th}$ sequences among the switches are turned off.

7. The antenna apparatus of claim 1, wherein:
   each of the switches includes first and second sub-switches; and the first sub-switch of each of the switches is connected to each of odd-numbered antenna device groups of each of the N antenna device groups.

8. The antenna apparatus of claim 7, wherein the second sub-switch of each of the switches is connected to each of even-numbered antenna device groups of each of the N antenna device groups.

9. The antenna apparatus of claim 1, wherein:
each of the switches includes first and second sub-switches; and
the second sub-switch of each of the switches is connected to each of even-numbered antenna device groups of each of the N antenna device groups.

10. A method of comprising:
providing a plurality of antenna devices to surround a center; and
connecting M switches to the plurality of antenna devices, M being an integer equal to or greater than 1;
wherein the plurality of antenna devices include N antenna device groups, each of the N antenna device groups including M antenna devices, N being an integer equal to or greater than 1; and
wherein the $m^{th}$ switch is connected to the $m^{th}$ antenna device of the each of the N antenna device groups, m being an integer ranging from 1 to M.

11. The method of claim 10, wherein M and N are each 4.

12. The method of claim 10, wherein the plurality of antenna devices surround the center and are disposed at positions of concentric circles.

13. The method of claim 10, wherein the plurality of antenna devices surround the center and are disposed at edges of a polygonal shape.

14. The method of claim 10, wherein the odd-numbered switches or the even-numbered switches are turned off.

15. The method of claim 10, wherein M is an even number and wherein switches positioned in first to $(M/2)^{th}$ sequences or switches positioned in $(M/2+1)^{th}$ to $M^{th}$ sequences among the switches are turned off.

16. The method of claim 10, wherein:
each of the switches includes first and second sub-switches; and
the first sub-switch of each of the switches is connected to each of odd-numbered antenna device groups of each of the N antenna device groups.

17. The method of claim 10, wherein:
each of the switches includes first and second sub-switches; and
the second sub-switch of each of the switches is connected to each of even-numbered antenna device groups of each of the N antenna device groups.

18. The method of claim 10, wherein:
each of the switches includes first and second sub-switches;
the first sub-switch of each of the switches is connected to each of odd-numbered antenna device groups of each of the N antenna device groups; and
the second sub-switch of each of the switches is connected to each of even-numbered antenna device groups of each of the N antenna device groups.

19. A method of operating an antenna apparatus that comprises a plurality of antenna devices disposed to surround a center and M switches connected to the plurality of antenna devices, wherein the plurality of antenna devices include N antenna device groups that each include M antenna devices, M and N each being an integer equal to or greater than 1, the method comprising:
determining a direction of a beam to be transmitted from the antenna apparatus;
operating the switches to select an $m^{th}$ antenna device of the each of the N antenna device groups, m being an integer and $1 \leq m \leq M$; and
transmitting the beam from the antenna apparatus using selected antenna devices.

20. The method of claim 19, wherein transmitting the beam comprises transmitting the beam from the antenna apparatus using all of the selected antenna devices.

* * * * *

UNITED STATES PATENT AND TRADEMARK OFFICE
CERTIFICATE OF CORRECTION

PATENT NO. : 11,043,992 B2  
APPLICATION NO. : 16/561934  
DATED : June 22, 2021  
INVENTOR(S) : Oh et al.

Page 1 of 1

It is certified that error appears in the above-identified patent and that said Letters Patent is hereby corrected as shown below:

In the Claims

Claim 10, Column 7; Line 14 delete "A method of comprising" insert --A method comprising--

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*